(No Model.)

A. G. MOYER.
BUTTER CASE.

No. 373,901.  Patented Nov. 29, 1887.

Witnesses.
Chas. R. Burr.
Thomas Durant.

Inventor.
Allen G. Moyer
By Church & Church
his Attorneys.

UNITED STATES PATENT OFFICE.

ALLEN G. MOYER, OF HILLTOWN, ASSIGNOR TO HENRY W. GROSS, OF DOYLESTOWN, PENNSYLVANIA.

BUTTER-CASE.

SPECIFICATION forming part of Letters Patent No. 373,901, dated November 29, 1887.

Application filed October 25, 1886. Serial No. 217,162. (No model.)

*To all whom it may concern:*

Be it known that I, ALLEN G. MOYER, of Hilltown, in the county of Bucks and State of Pennsylvania, have invented certain new and useful Improvements in Butter-Cases; and I do hereby declare the following to be a full, clear, and exact description of the same, reference being had to the accompanying drawings, forming part of this specification, and to the figures and letters of reference marked thereon.

My present invention has for its object to provide a convenient, inexpensive, and efficient means for handling and transporting perishable and other articles, more especially butter in the form of blocks, cakes, or prints; and it consists, essentially, in the arrangement and combination, within an inclosing box or case, of a series of removable and independent sections carrying trays, said sections being arranged to fill or nearly fill the interior of the receptacle; and it further consists in the several novel combinations and arrangements of parts, as hereinafter more fully described, and pointed out in the claims.

Figure 1:
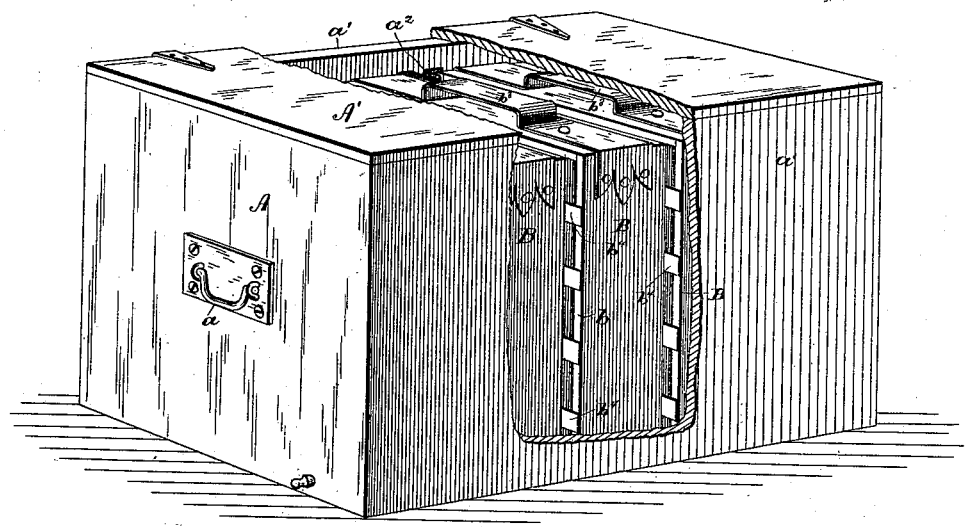
Figure 2:
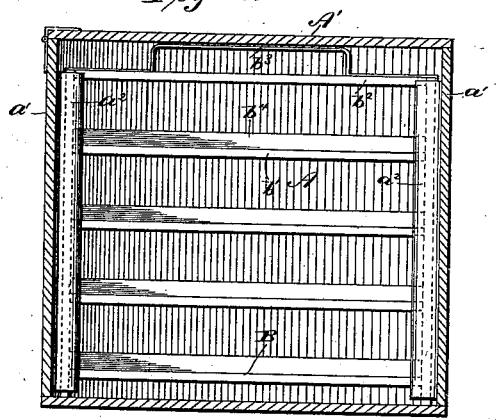
Figure 3:
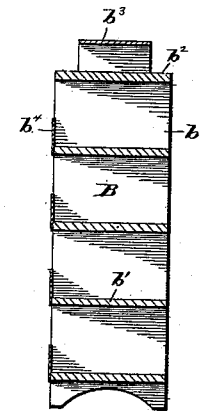
Figure 5:
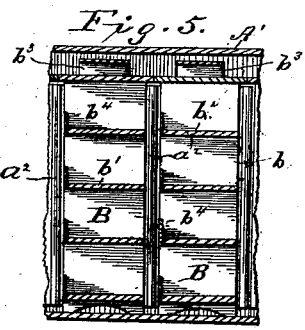
Figure 4:
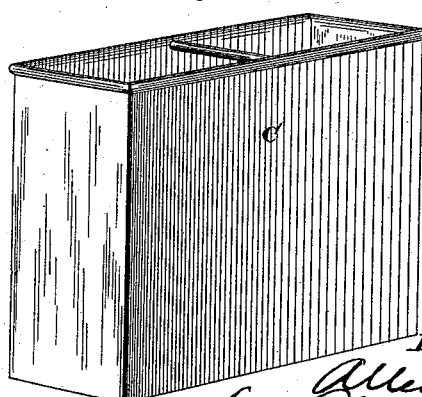

In the accompanying drawings, Figure 1 is a perspective view of my improved case, with a portion of the casing broken away to show the interior arrangement. Fig. 2 is a transverse section. Fig. 3 is a transverse sectional view of one of the removable trays. Fig. 4 is a perspective view of an ice box or chamber adapted to supply the place of one of the sections. Fig. 5 is a view of a modification.

Similar letters of reference in the several figures indicate like parts.

The letter A indicates the inclosing box or case, of any suitable material, provided with a lid, A', and handles $a\, a$ at either end, if desired.

Within the box A, and to the opposite parallel sides $a'\, a'$ thereof, are secured the division strips or guides $a^2$, preferably of sheet metal bent into U shape and united to the sides by nails or screws passing through the flanges. These strips, as well as all other parts, when constructed of material liable to be injuriously affected by moisture, are properly covered with a non-oxidizable coating.

The strips $a^2$ serve as guides to direct and sustain the removable sections B, each of which latter is composed of the standards or side pieces, $b$, supporting a series of shelves, $b'$, and provided with a top piece, $b^2$, to which a suitable handle, $b^3$, is attached. To one side of each shelf is preferably secured a retraining strip or backing, $b^4$, and the lowest shelf is somewhat elevated above the bottom of the case A, leaving a space underneath, for a purpose to be explained. As thus constructed and arranged, the butter in prints is placed upon the shelves of each section, and the several sections inserted between the guides in the case A. When the cover A' is closed and secured, the whole is ready for transportation, the several prints being separately supported and ample space provided for the necessary circulation of air.

When it becomes necessary or desirable to obtain access to the butter, to remove or exhibit it, any section can be conveniently raised and the material thereon brought to view without disturbing the remainder, and so soon as one section is emptied it is returned to place, thus closing the case and preventing the entrance of dust, &c. The manipulation of the sections in the manner pointed out, to exhibit the butter, is much facilitated by the presence of the strips $b^4$, against which the prints rest and are thus prevented from falling off the shelves.

When, as in very warm weather, it is found desirable to employ a refrigerant to preserve the butter, one or more ice-boxes C, of the same dimensions as the removable section B, can be inserted in place of any one or more sections. This ice-box C can readily be inserted between the guides at any desirable point in the case, and may be used either as a fixture or as a substitute for one of the removable sections B, in which latter case, as the sections are emptied of their contents, it can be transferred next the succeeding case, and thus be kept near the full sections.

The U-shaped guiding-strips serve in a measure to promote the circulation of air through the case, being left open at both top and bottom for that purpose. If found desirable, the top pieces or covers of the several sections may be made sufficiently wider than the shelves to meet when inserted in the box or case, and thus more effectively prevent the entrance of dust when the lid is elevated, as shown in Fig. 5.

Whenever an ice-box is employed, there is more or less liability of the water slopping over, particularly when transporting the case a long distance and over rough roads, and in order that the water may not come in contact with the butter, I prefer to elevate the lower shelf slightly above the bottom of the case, as stated, so that a space is left at this point, which not only forms a receptacle for the water, but also serves to, in a measure, promote the circulation of air within and through the case.

With a case or package such as described, butter in prints, and other perishable articles, and such as are liable to injury during transportation and handling, can readily be shipped to a market from a distance and then retained and exposed for inspection and sale without further handling.

Moreover, any one section can be removed at will and its place supplied from another like receptacle, or it can be refilled; and when it becomes necessary to employ a refrigerant any section can be replaced by one of the removable ice-chests without in any manner disturbing the remaining sections or requiring special fitting.

I claim as my invention—

1. The combination, with the inclosing-casing and the removable sections arranged vertically therein for supporting articles, of the hollow guides for the sections, secured to the sides of the receptacle and open at both ends, serving to guide and support the sections in position and also serving as a means for promoting a circulation of air within the case, substantially as described.

2. The combination, with the inclosing-casing and the removable sections arranged vertically therein for supporting articles, of the vertical guides secured to the sides of the casing, between which the sections are placed, having the central channels and the lateral flanges, said channels being open at both ends and adapted to promote a circulation of air within the casing, substantially as described.

ALLEN G. MOYER.

Witnesses:
FRANK WAUDSLEBEE,
MARKS WEIL.